United States Patent [19]

Taylor et al.

[11] Patent Number: 5,621,195
[45] Date of Patent: Apr. 15, 1997

[54] SENSOR ARRAY SYSTEM FOR DETERMINING AXLE SPACING

[75] Inventors: Brian Taylor; Terry Bergan, both of Saskatoon, Canada

[73] Assignee: International Road Dynamics Inc., Canada

[21] Appl. No.: 488,452

[22] Filed: Jun. 7, 1995

Related U.S. Application Data

[63] Continuation of Ser. No. 55,249, May 3, 1993, abandoned.

[51] Int. Cl.$^6$ .............................. G01G 19/02; G01B 7/02
[52] U.S. Cl. .............................. 177/133; 33/700; 246/247
[58] Field of Search .................................... 177/133, 134, 177/163; 377/9; 246/247; 33/700, 701, 706

[56] References Cited

U.S. PATENT DOCUMENTS

| | | |
|---|---|---|
| 2,268,925 | 1/1942 | Cooper ........................................ 377/9 |
| 3,346,856 | 10/1967 | Doble et al. . |
| 3,486,008 | 12/1969 | Mori ............................................. 377/9 |
| 3,842,922 | 10/1974 | Fagin et al. ........................ 177/134 X |
| 3,927,389 | 12/1975 | Neeloff ..................................... 377/9 X |
| 4,248,396 | 2/1981 | Hunt, Jr. .................................. 246/247 |
| 4,383,239 | 5/1983 | Robert .................................... 377/9 X |
| 4,667,757 | 5/1987 | Johnson ..................................... 177/1 |
| 5,020,236 | 6/1991 | Kauer et al. .............................. 33/700 |

Primary Examiner—Michael L. Gellner
Assistant Examiner—Randy W. Gibson
Attorney, Agent, or Firm—Nixon & Vanderhye P.C.

[57] ABSTRACT

In a system for determining the spacing between axles on a vehicle, problems associated with the determination in a stop-and-go situation are overcome with a sensor array system wherein a first sensor is spaced from an array of sensors by a predetermined distance. The total length of the span of all the sensors must be greater than largest axle spacing on the vehicle to be measured. When two axles simultaneously trigger sensors, those triggered sensors' positions are sent to a computer and the axles spacing is computed and recorded. The system operates independently of the speed of the vehicle.

9 Claims, 4 Drawing Sheets

SENSOR ARRAY SYSTEM FOR DETERMINING AXLE SPACING

This is a continuation of application Ser. No. 08/055,249, filed May 3, 1993, now abandoned.

BACKGROUND OF THE INVENTION (i) Field of the Invention

This invention relates to a sensor array for determining vehicle axles spacings particularly in stop-and-go situations, and more specifically, in situations which are independent of speed. The system can be coupled with various other systems, e.g., weighing, in order to weigh and determine the configuration of the vehicle axles.

(ii) Description of the Prior Art

Axle spacing is important for a number of reasons, but is generally used to classify vehicles into types. For heavy commercial vehicle enforcement, the spacing of axles is important to determine the allowable loads which may be carried by the vehicle. In other applications, the number and spacing of axles is important to determine vehicle fare at toll facilities.

In one type of previous system, a speed detector was combined with an axle detector. The vehicle axle spacings were determined by timing the axle units on the axle sensors, and then, by using the vehicle speed, computing the spacings. In such system, the average vehicle speed was used.

In another system, two axle detectors were used. The speed of each axle was determined, and the speed between two axles was averaged to obtain the overall spacing between two axles, according to the equation: (speed)(time)=distance. In such system, the axle speeds were used.

The axle speed method was more accurate than the vehicle speed method when vehicles were changing speed over the sensors, but neither system worked adequately in a stop-and-go application.

The patent literature also proposed some systems for determining axle spacings. Thus, U.S. Pat. No. 4,539,650 patented Sep. 3, 1985 by T. G. Griffin et al, purported to provide a system for calculating and indicating the weight of moving vehicles. This system was devised particularly for weighing moving vehicles (trucks) on the highway. It included means for sensing both the impact of the mass of the truck, and the speed, each producing an electronic signal, and using the signals to indicate the total weight of the truck. The mass was sensed by an impact component having a bladder, operating on fluid displacement, and producing an electronic signal thereby. The speed was sensed by a radar component, utilizing the Doppler effect, and produced another electronic signal. The two signals determined a signal which indicated the weight of the truck axles. The axles were sensed individually, both as to impact and speed, and the signals produced by these two factors were used as to each axle to show the weight of each axle, and were themselves combined to show the final total weight of the truck. A component was included to sense the presence of the truck in the sensing range, and its departure therefrom, to detect individual trucks following one another and thereby to control the signals relating to each individual truck.

U.S. Pat. No. 4,667,757 patented May 26, 1982 by B. A. Johnson, was said to provide a system for determining the spacing between axles of a vehicle which may be in motion, on the basis of weight alone. A weighbridge was provided with a first load cell spaced from a second load cell along the length of the weighbridge by a specified distance, with each load cell being responsive to the load on its respective location on the weighbridge. After a first axle was on the weighbridge, the weight on the first load cell and the weight on the second load cell were periodically sampled. The average stored weight of the first axle was determined at the time when a second axle was about to enter the weighbridge. The instantaneous weight on the second load cell was measured at the time when the second axle was about to enter the weighbridge. The distance between the first axle and the second axle was determined by calculating. Distances between subsequent axles could also be determined in the following manner: after the first axle had entered the weighbridge at a time when a second axle was about to enter the weighbridge, the weight on the first load cell and the weight on the second load cell were measured and the distance between the first axle and the second axle was determined by calculating, according to the formula:

$$W2L/(W1+W2)$$

SUMMARY OF THE INVENTION (i) Aims of the Invention

Yet these patents do not provide the optimum solution to the problems of axle-spacing in a stop-and-go situation. Accordingly, an object of the present invention is to provide a system for determining the spacing between axles of a vehicle without regard to the speed or movement of the vehicle.

Another object of the present invention is to provide a system for the weighing of vehicles without regard to the speed or movement of the vehicle.

Yet another object of the present invention is to provide a system for determining the configuration of vehicle axles without regard to the speed or movement of the vehicle.

(ii) Statement of Invention

The present invention provides a system for mounting on a roadway for determining the number of axle units on a vehicle travelling along the roadway and the distance between an axle unit and an immediately adjacent axle unit, the system comprising: (I) a vehicle detector; (II) an overheight detector; (III) a sensor array system, the sensor array system comprising (i) a first group of axle sensors comprising at least one pair of spaced-apart axle sensors, the distance between adjacent spaced-apart axle sensors in such first group of axle sensors being distance "a" and (ii) a second group of axle sensors which includes at least three axle sensors which are more closely spaced apart by a distance "d" which is less than the distance "a" between adjacent sensors of the first group of axle sensors; wherein (a) the span between a first axle sensor and a last axle sensor of the second group of axle sensors is distance "b"; and (b) the span between a first sensor in the first group of sensors and a last sensor in the second group of sensors is distance "c"; so that: the distance "c" must be greater than, or equal to, the largest unknown axle spacing to be measured on the vehicle; the distance "b" must be greater than, or equal to, distance "a"; and the spacing "d" must be such that any axle of the vehicle must trigger at least one sensor; and (IV) a signal processor which receives and processes signals which are generated by the first group of sensors and by the second group of sensors, thereby to determine axle unit spacing which previously was unknown and the number of axle units of the vehicles, which also previously was unknown.

(iii) Further Features of the Invention

By one feature of this invention, each detector may be a force sensing member. By another feature of this invention, the spacing between each force sensing member in the array may be such that a wheel of a vehicle disposed over the array always triggers at least one force sensing member. By still another feature of the invention, the array of detectors may be disposed adjacent to at least one of the first and the last detectors.

By a further feature of the invention the subsequent sensors are spaced-apart by a distance "a"; wherein the closely spaced-apart sensors are spaced-apart by a distance "d", with the total distance of the closely spaced-apart sensors being "b"; wherein the total length of all distances "a" and distance "b" is distance "c"; and wherein the distance "c" is greater or equal than the largest axle spacing to be measured on the vehicle; the distance "b" is greater than or equal to "a"; and the spacing "d" is such that any axle of the vehicle over the array of sensors must trigger at least one sensor.

By still another feature of the invention, the sensor system may include a vehicle detector disposed in advance of the first plurality of force sensing resistors. Such vehicle detector may be an inductive loop detector, whereby the presence of a vehicle is detected by sensing the change in inductance due to the presence of a metallic vehicle, or it may be an infra-red-type vehicle detector, whereby the presence of a vehicle is detected by motion detection by an infra-red sensor.

By other features of this invention, the sensor system may include an automatic vehicle identification system; or it may include a vehicle sensing antenna; or it may include a scale, e.g., a scale which includes a plurality of load cells providing the ability to weigh as a static system or as a slow rollover system; or it may include at least one of an overheight detector; or it may include AVI (automatic vehicle identification) system; or it may include a freeze frame video vehicle camera.

By one feature of the method of this invention, the method may be used to determine the spatial relationship by the step of weighing each vehicle axle as it passes a weight measuring sensor.

(iv) Generalized Description of the Invention

Any sensor (which also includes an axle scale) that detects an axle can be used. One preferred sensor is the force sensing resistor provided in U.S. Pat. No. 4,799,381 patented Jan. 24, 1989 by C. M. Troup, and known by the Trademark, DYNAX$_{TM}$ (the contents of which are incorporated herein by reference). The DYNAX$_{TM}$ array is capable of determining axle spacing to within ±6 inches when vehicles are moving through the system at slow or fast speeds, or even if they are stopped. The system of the present invention has the ability to calculate axle spacing in stopped or moving modes, independent of speed.

The whole system is adapted to run on one computer system which receives all signals (of force sensing members and the scale of any arrays). It is preferably provided with custom displays. The system preferably also has a signal control interface which preferably is incorporated into the computer to control optional traffic signals. The system may also be hooked up to a digital display of weights. The system is preferably also adapted to interface with an Automatic Vehicle Identification (AVI) system and also is adapted to control traffic signs and a camera system. The present system is not limited to use at weight stations, or toll stations.

The system is preferably capable of remote operation. The system may be turned "on" or "off" from a control location. The weighing station may be located at any convenient place, for example, in a lay-by or service area. The weighing station may form part of a network of weighing stations throughout a region. Such a weighing station may be, and preferably is, unattended, the various transmitting receiving devices and processing devices associated with the weighing station being preferably made secure against unauthorized entry or vandalism.

An arrangement may be provided wherein a number of sensors are arranged side by side, each sensors being connected by a lead wire to the electrical circuit system. In this instance, a vehicle tire will cover several of the sensors and also, several of the resistor gap areas. Thus, the pressure of the tire will cause several of the gap areas to be shunted simultaneously. By properly sensing the number and location of the shunted gap areas, as well as the number of sensors covered by the tire, the tire size (i.e. its diameter and/or its width may be determined. Tire size is especially important in determining the maximum allowable axle loads based on tire size.

BRIEF DESCRIPTION OF THE DRAWINGS

In the accompanying drawings.

Figure 1:
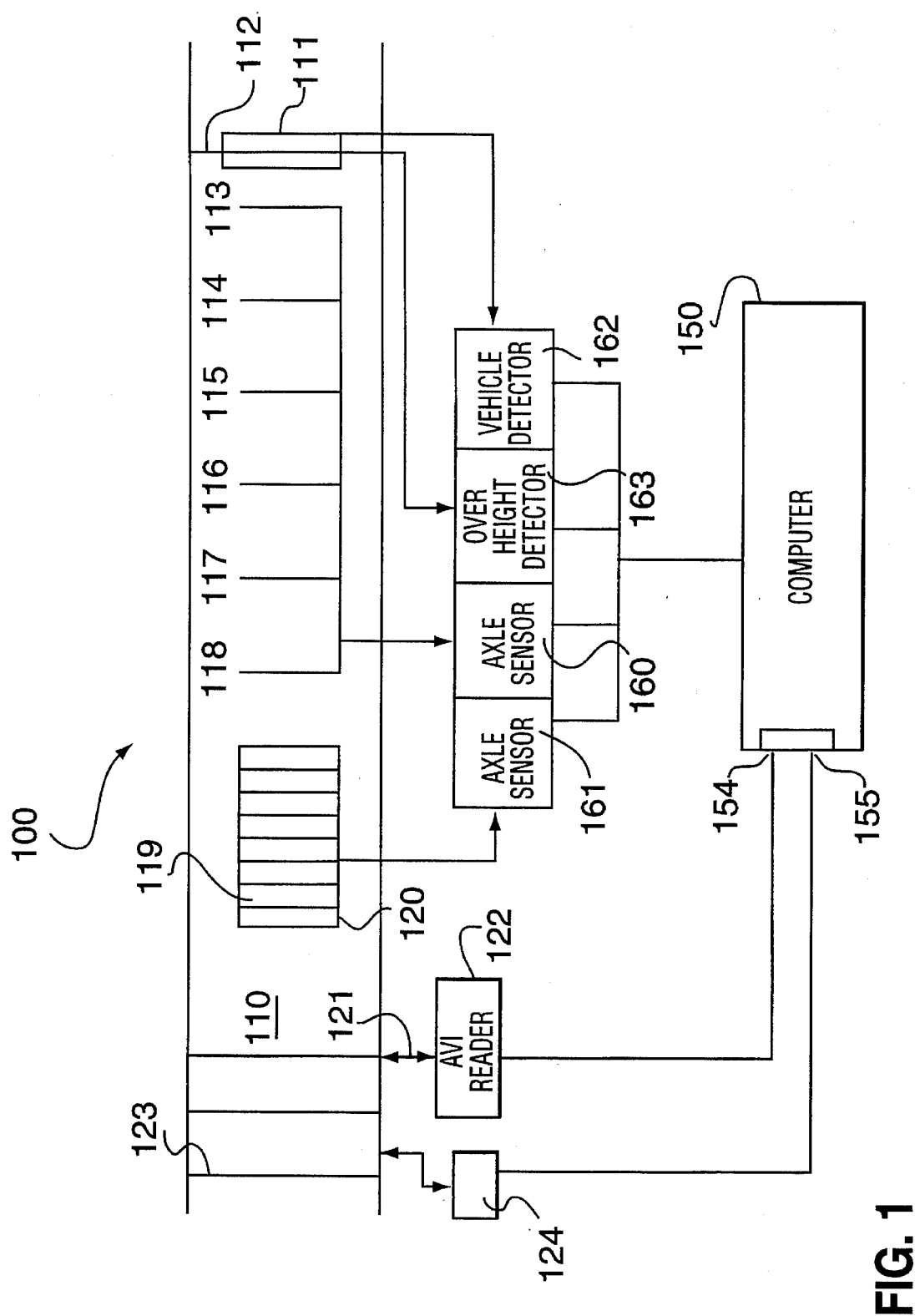
FIG. 1 is a configuration diagram of the axle sensor system.

DESCRIPTION OF PREFERRED EMBODIMENTS (i) Description of FIG. 1

As seen in FIG. 1, a roadbed 110 is provided with the system 100 of the present invention. The system 100 includes a vehicle detector 111, which preferably is an inductive loop.

An overheight detector 112 may optionally be positioned at the region of the vehicle detector 111 to detect vehicles that exceed a predetermined height. Such overheight detector 112 may comprise photoelectric means or may simply be triggered when a portion of the body of a vehicle makes contact with a switch in its path. Downstream of the overheight detector are a plurality, i.e. six, axle counter sensors 113–118, which preferably are DYNAX$_{TM}$ sensors, which are spaced, e.g., five feet apart. Spaced, e.g., five feet downstream from the last axle sensor 118 is an array 119 of eleven axle sensors, preferably DYNAX$_{TM}$ sensors, spaced, e.g., six inches apart and in a frame 120.

Downstream from the frame 120 on the roadbed 110 an automatic vehicle identification system antenna (AVI) 121 may be provided, that is connected to an AVI reader 122, the output of which is connected to a serial communication port 154 of a computer 150. In addition, a scale 123 may be provided the output of which is connected to a serial communication port 155 of computer 150. Finally, a freeze frame video vehicle camera 124 may be provided. The system 100 of this invention is controlled, as shown in FIG. 1, by the computer 150.

The output from the individual axle sensors 113–118 is connected to an axle sensor data receiver 160, while the output from the array 119 is connected to another axle sensor data receiver 161. The output from the vehicle detector 111 is connected to data receiver 162. If an overheight detector 112 is provided, its output is connected to data receiver 163.

Typically the roadway is twelve feet wide and the spacing between the vehicle detector loop (112) and the slow roll-over scale (123) is ninety-three feet.

Figure 2:
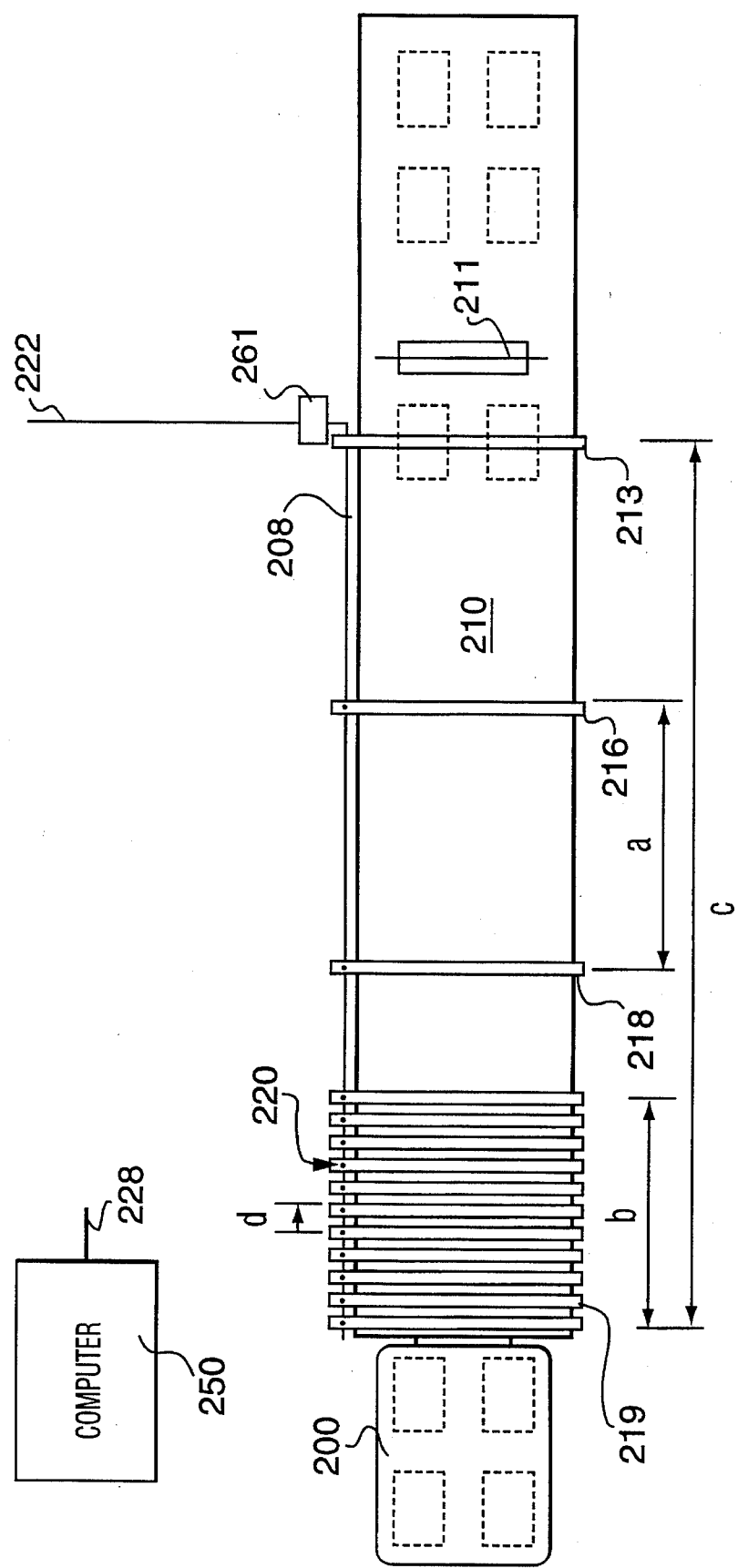
FIG. 2 is a block diagram of a truck over the axle sensors in one alternative embodiment of the system shown in FIG. 1.

(ii) Description of FIG. 2

Referring to FIG. 2, a vehicle detector 211 is disposed on the roadway 210 and is connected by means (not shown) to a computer 250. Downstream from the vehicle detector 211 is a plurality of subsequent sensors 213–218, only sensors 213, 216 and 218 being shown for clarity. An array 220 of sensors 219 is disposed downstream of the last sensor 218. A vehicle 200 is shown positioned over an array 220 of eleven sensors 219. The sensors 219 are connected to an axle sensor data receiver 261 along a data bus 208, over which signals may be carried to a terminal 222. A terminal 228 at computer 250 may be connected by means (not shown) to the terminal 222. Alternatively, the terminal 222 may be connected to a modem (not shown) for communicating with computer 250 via telephone lines (not shown).

The entire distance "c" is shown filled with subsequent sensors 213–218 and the array 220 of closely spaced-apart sensor 219. The subsequent sensors 213–218 are spaced a distance "a" apart. The distances "a" between each of subsequent sensors 213–218 should preferably be equal in order to enhance reliability. However, if the subsequent sensors are not equally spaced, assumptions can be made to reduce any error. It is necessary, however, for the following conditions to be met:

the distance "c" must be greater or equal than the largest axle spacing to be measured on the vehicle;

the distance "b" of the array of sensors must be greater or equal to "a"; and the spacing "d" between the sensors 219 in the array 220 of length "b" must be such that any axle of the vehicle over the array of sensors must trigger at least one sensor.

Figure 3:
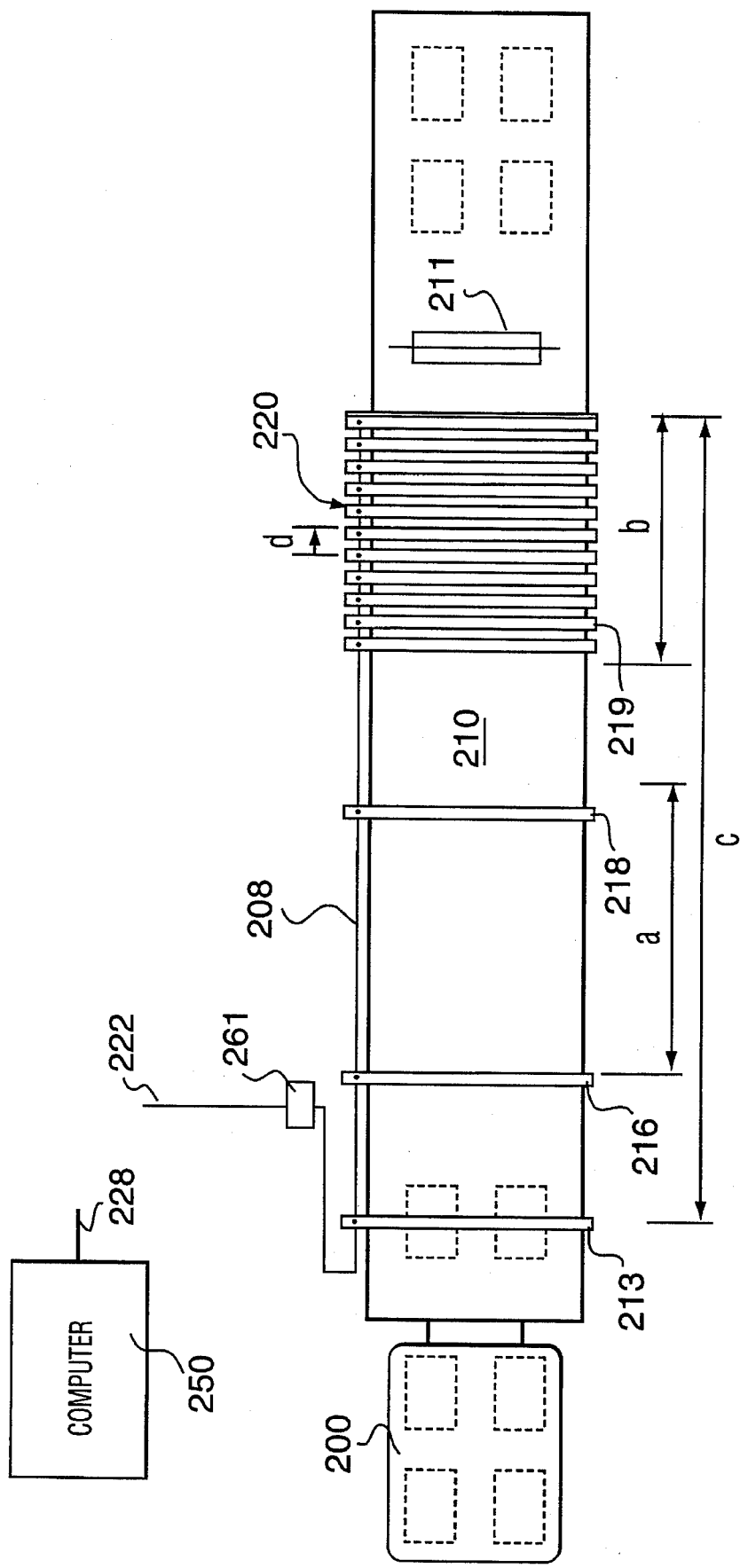
FIG. 3 is a block diagram of a truck over the axle sensors in a second alternative embodiment of the system shown in FIG. 1.

(iii) Description of FIG. 3

Referring to FIG. 3, a vehicle detector 211 is disposed in a roadway 210 and is connected by means (not shown) to a computer 250. Downstream from the vehicle detector 211 is an array 220 of sensors 219. Downstream of the array 220 of sensor 219 is a plurality of subsequent sensors 213–218, only sensors 213, 216 and 218 being shown for clarity. A vehicle 200 is shown with one of its axles positioned over sensor 213. The sensors 219 are connected to an axle sensor data receiver 261 along a data bus 208, over which signals may be carried to a terminal 222. A terminal 228 at computer 250 may be connected by means (not shown) to the terminal 222. Alternatively, the terminal 222 may be connected to a modem (not shown) for communicating with computer 250 via telephone lines (not shown).

The entire distance "c" is shown filled with subsequent sensors 213–218 and the array 220 of sensor 219. The subsequent sensors 213–218 are spaced a distance "a" apart. The distances "a" between each of sensors 213–218 should preferably be equal in order to enhance reliability. However, if the subsequent sensors are not equally spaced, assumptions can be made to reduce any error. It is necessary, however, for the following conditions to be met:

the distance "c" must be greater or equal than the largest axle spacing to be measured on the vehicle;

the distance "b" of the array of sensors must be greater or equal to "a"; and the spacing "d" between the sensors 219 in the array 220 of length "b" must be such that any axle of the vehicle over the array of sensors must trigger at least one sensor.

Figure 4:
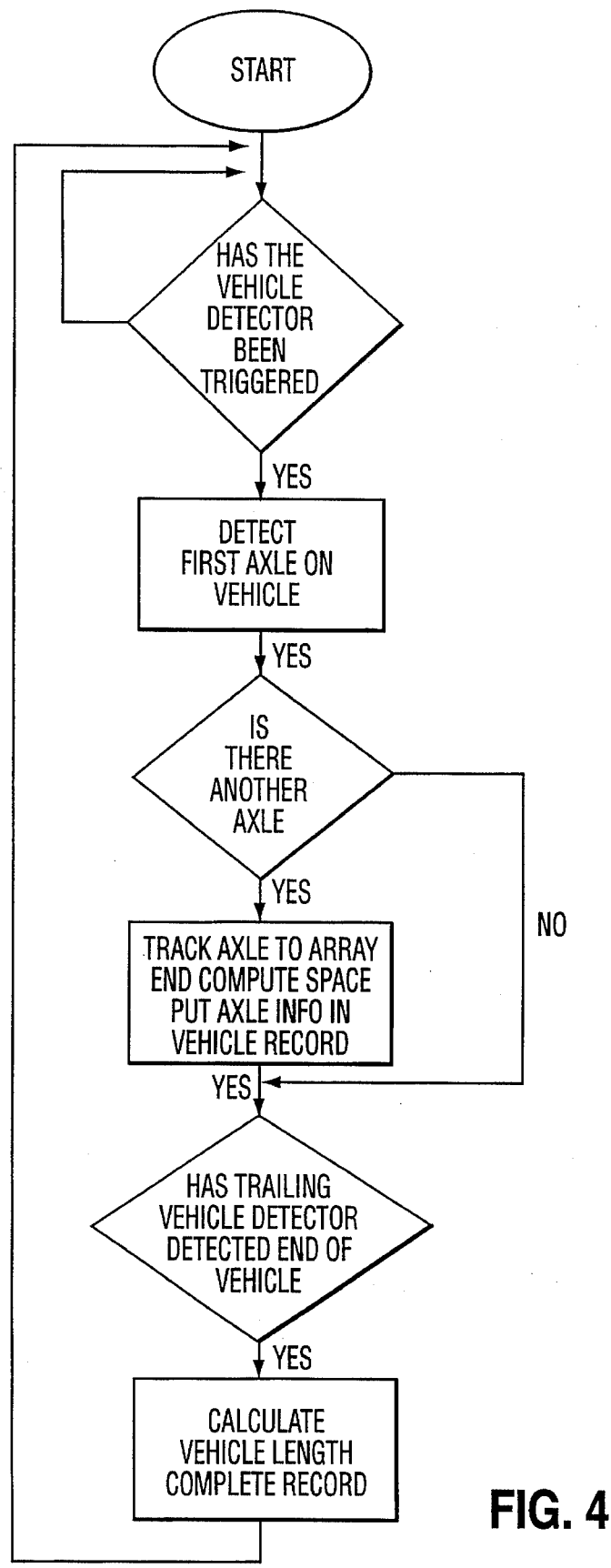
FIG. 4 is a flow chart showing the basic structure of a sofware program for controlling the axle sensor system as shown in FIGS. 1 to 3.

(iv) Description of FIG. 4

Referring to FIG. 4, basic flow of program execution is shown. Initially the computer is in a wait state, waiting for acknowledgement from the vehicle detector, that a vehicle has been detected. Of course the computer could be returning to a wait routine every few milliseconds, performing other tasks when it is not waiting. Alternatively the vehicle detector can assert an interrupt signal interrupting the computer when a vehicle has been detected. If a vehicle has been detected, the computer waits until it receives a signal indicating that a first axle has been detected. If there is another axle, the computer tracks the axle to the array end and computes the space between that axle and the one which follows it. If the trailing vehicle detector has detected the end of the vehicle, the vehicle length record is completed. It should be obvious to one skilled in the art, that this basic flow chart can be modified to include the many aspects of the invention heretofore described. For instance, the axles can be individually weighed, and the total weight of the vehicle can be calculated; the identification and the class of the vehicle can be determined and can be appended to the vehicle record.

OPERATION OF THE PREFERRED EMBODIMENTS OF THE INVENTION (i) Operation of the System of FIG. 2

In operation, the system of FIG. 2 works in the following manner. As a vehicle moves along a roadway 210 its presence is detected by vehicle sensor 211 and its front wheels carried by a first axle contact the first sensor 213 positioned upstream from the array 220 of sensors 219. A signal indicating the axle contact is transmitted to the computer 250 via axle sensor data receiver 261 along data bus 208; a counter register within the computer 250 is initialized to a value of 1 indicating the detection of the first axle. As the vehicle moves the wheels carried by the first axle make contact with the array 220 of sensors 219. As the wheels pass over the sensors 219 in the array 220, they always contact at least one sensor 219. When the wheels carried by the first axle and the next pair of wheels carried by the second axle are simultaneously detected by any two or more sensors, the two or more sensors each send a signal to the axle sensor data receiver 261 along data bus 208. The signal is transmitted to the computer 250, indicating this event as well as indicating their position, i.e. if it was the 2nd and 8th sensor in the array that were triggered simultaneously, this information is sent to the computer 250 for processing. The computer 250 keeps track of the number of axles that have been detected and their respective spacing which is calculated by subtracting the distance between triggered sensors. A detector (not shown), sends a signal to the computer when the vehicle has passed through the system. Of course, writing a computer program for this system is within the ability of a computer programmer skilled in the art.

SUMMARY

The principal advantage of using the array of sensors is that at no time is vehicle axle speed required to compute the spacings of adjacent axles. Therefore, the system can operate at zero speed, i.e. "stop-and-go" traffic. Using a sensor array, the speed of the vehicle is not a factor in the spacing calculations. The vehicle can stop and go, and even back up on the sensors and spacings are still determined.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A system for mounting on a roadway for determining the number of axle units on a vehicle travelling along the roadway and the distance between an axle unit and an immediately adjacent axle unit, said system comprising:

(I) a vehicle detector;
   (II) an overheight detector;
   (III) a sensor array system, said sensor array system comprising
      (i) a first group of axle sensors comprising at least one pair of spaced-apart axle sensors, the distance between adjacent said spaced-apart axle sensors in said first group of axle sensors being distance "a";
      and (ii) a second group of axle sensors which includes at least three axle sensors which are more closely spaced apart by a distance "d" which is less than said distance "a" between adjacent said axle sensors of said first group of axle sensors;
      wherein (a) the span between a first axle sensor and a last axle sensor of said second group of axle sensors is distance "b";
      and (b) the span between a first axle sensor in said first group of axle sensors and a last axle sensor in said second group of axle sensors is distance "c"; so that:
      said distance "c" must be greater than, or equal to, the largest unknown axle spacing to be measured on the vehicle; .
      the distance "b" must be greater than, or equal to, distance "a";
      and the spacing "d" must be such that any axle of the vehicle must trigger at least one axle sensor;

and (IV) a signal processor which receives and processes signals which are generated by said first group of axle sensors and by said second group of axle sensors, thereby to determine axle unit spacing which previously was unknown and the number of axle units of the vehicles, which also was previously was unknown.

2. The system of claim 1 wherein said vehicle detector comprises an inductive loop detector, whereby the presence of a vehicle is detected by sensing the change in inductance due to the presence of a metallic vehicle.

3. The system of claim 1 wherein said vehicle detector comprises an infra-red-type vehicle detector, whereby the presence of a vehicle is detected by motion detection by an infra-red sensor.

4. The system of claim 1 including an automatic vehicle identification system.

5. The system of claim 1 including a vehicle sensing antenna.

6. The system of claim 1 including a scale.

7. The system of claim 6 wherein said scale includes a plurality of load cells providing the ability to weigh as a static system or as a slow rollover weigh-in motions system.

8. The system of claim 1 wherein said vehicle detector comprises an infra-red type vehicle detector.

9. The system of claim 1 wherein each of said axle sensors is a force sensing member.

* * * * *